(12) United States Patent
Brookner et al.

(10) Patent No.: US 9,495,809 B2
(45) Date of Patent: Nov. 15, 2016

(54) GUARANTEED POSTAGE

(75) Inventors: George Brookner, Norwalk, CT (US);
Gary Morris, Arlington, VA (US)

(73) Assignee: Neopost Technologies, Bagneux (FR)

( * ) Notice: Subject to any disclaimer, the term of this patent is extended or adjusted under 35 U.S.C. 154(b) by 468 days.

(21) Appl. No.: 12/402,871

(22) Filed: Mar. 12, 2009

(65) Prior Publication Data

US 2010/0235267 A1   Sep. 16, 2010

(51) Int. Cl.
| G07B 17/00 | (2006.01) |
| G06Q 10/10 | (2012.01) |
| G06Q 20/10 | (2012.01) |
| G06Q 50/32 | (2012.01) |
| G06Q 40/00 | (2012.01) |

(52) U.S. Cl.
CPC ......... *G07B 17/00362* (2013.01); *G06Q 10/10* (2013.01); *G06Q 20/10* (2013.01); *G06Q 40/12* (2013.12); *G06Q 50/32* (2013.01); *G07B 17/00435* (2013.01); *G07B 2017/0037* (2013.01); *G07B 2017/00161* (2013.01); *G07B 2017/00169* (2013.01); *G07B 2017/00427* (2013.01)

(58) Field of Classification Search
CPC ............... G07B 3/00; G07B 3/02; G07B 3/04; G07B 9/00; G07B 17/00
USPC .......... 379/93.12, 106.06, 111; 705/60, 403, 705/16, 14.36, 26.1
See application file for complete search history.

(56) References Cited

U.S. PATENT DOCUMENTS

| 4,787,045 A * | 11/1988 | Storace ............ G07B 17/00024 |
| | | 379/102.01 |
| 4,812,992 A * | 3/1989 | Storace ............. G07B 17/0008 |
| | | 379/106.06 |
| 6,965,872 B1 * | 11/2005 | Grdina ............... G06Q 30/0225 |
| | | 705/14.26 |
| 7,194,957 B1 * | 3/2007 | Leon ........................ B41J 11/42 |
| | | 101/483 |
| 7,458,612 B1 * | 12/2008 | Bennett ............ G07B 17/00508 |
| | | 283/81 |
| 8,346,616 B2 * | 1/2013 | Hwang .................. G06Q 30/02 |
| | | 235/380 |
| 2001/0013025 A1 * | 8/2001 | Ananda ................. G06F 21/125 |
| | | 705/60 |

* cited by examiner

*Primary Examiner* — Rokib Masud
(74) *Attorney, Agent, or Firm* — Morris & Kamlay LLP (57) ABSTRACT

A system and method for managing a value of a descending register of a postal security device (PSD) in accordance with a guarantee is disclosed. Mailing data including a guarantee rate, and a public rate of postage disbursed for a mailpiece franked under terms of the guarantee, can be received. The public rate and the guarantee rate can be compared, and if the public rate is equal to or less than the guarantee rate, postage funds can be downloaded from an account corresponding to a lessee of the PSD.

19 Claims, 6 Drawing Sheets

GUARANTEED POSTAGE

BACKGROUND OF THE INVENTION

Carrier fees for delivering items can vary unpredictably. Rates can change based upon regulatory changes, such as for postage rates for the United States Postal Service (USPS) or other national carriers. Rates can also change based upon business considerations, such as the competitive environment, fuel costs and other externalities. For example, private carriers such as United Parcel Service and Federal Express can respond to changes in such conditions by changing their rates.

Figure 1:
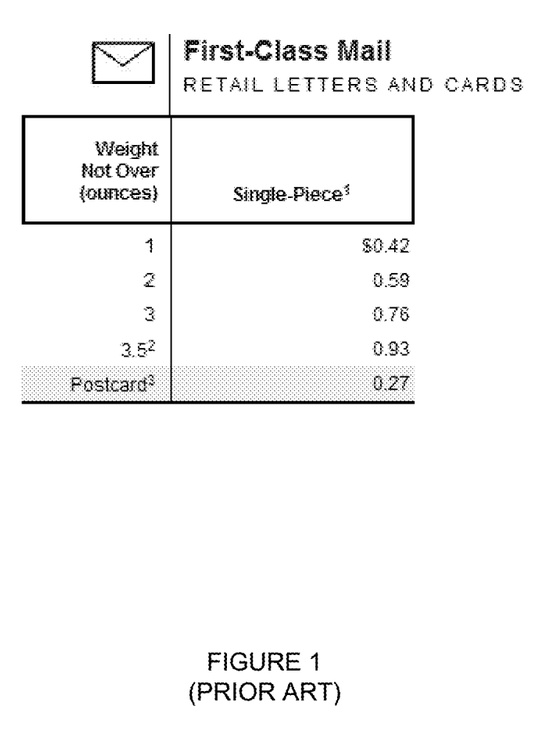
FIG. 1 shows a prior art rate table.

Rates can be set based upon various factors (hereinafter, "rate factors"), including, without limitation, the weight and shape (physical dimensions) of the item to be delivered, the class of service (e.g., first-class, second-class, etc.), the distance between the sender and the recipient (e.g., the zones systems used by United Parcel Service and Federal Express), additional services rendered (return receipt requested, delivery verification, insurance, etc.), the type of item to be delivered (e.g., hazardous, fragile, etc.), customs duties, etc., or any combination thereof. Rates are often embodied in a rate table (also known as a rate schedule) that correlates a cost of delivery with such rate factors. An example of a rate table is shown in FIG. 1, which shows the retail cost of mailing first-class letters in various weight ranges using the USPS.

Metered Mail allows customers to prepare items to be mailed without affixing traditional postage in the form of stamps. Carrier customers can be provided with a mailing machine having a meter, generally a Postal Security Device (PSD). The meter is typically leased to customers who may purchase postage via a corresponding account linked to the meter. Postage may be loaded in the PSD via a service provider infrastructure. Once loaded with prepaid postage, the PSD may be used to print indicia on items to be mailed indicating that postage has been paid. The mailing machine that is processing the flow of mailpieces can store a rate table. The amount of postage can be determined based upon the rate table stored at the mailing machine. When the quantity of postage remaining in the PSD runs low, customers may purchase additional postage from the service provider, after which the service provider may load the PSD with the additional postage.

The format of the indicia printed on a mailpiece is typically standardized. The printed form of the indicia can be a machine readable bar code containing several pieces of information, including, e.g., a serial number identifying the PSD and vendor which generated the indicium, a mailpiece count value, the present value of an ascending register, and/or the present value of a descending register in the PSD. The ascending register is retained in the PSD memory that stores a value that represents the total amount of postage metered by the PSD using, for example, postage credits over its lifetime. The ascending register value begins at zero and is incremented by the value of postage associated with each piece of mail processed. The descending register is retained in the PSD memory that stores a value that represents the total amount of postage credits currently loaded in the PSD. The descending register is set when the PSD is loaded with postage funds and is decremented as each piece of mail is processed until no postage finds remain. The descending register may be increased again when the PSD is refilled with additional postage funds. The mailpiece count value can sequentially identify each mailpiece processed by a particular PSD.

The mailing machine can download data that defines the rate table. The mailing machine uses the data defining the rate table to automatically ensure that the correct amount of postage funds (as reflected in the value stored in the PSD's descending register) are disbursed and encoded in an indicium for each given mailpiece based upon its rate factors. When postal rates change, new data defining a new rate table can be downloaded to the mailing machine.

Changes in carrier rates can pose significant financial risks to the carriers' customers, particularly those who send large volumes of mail. For example, the amount of money spent by companies that mail large volumes of monthly bills can amount to millions of dollars per year. Even small fluctuations in carrier rates can wreak havoc with such customers' budgets. What is needed is a system and method for mitigating the financial risk to customers of changing carrier rates.

SUMMARY OF THE INVENTION

An embodiment of the invention includes a method for managing a value of a descending register of a postal security device (PSD) in accordance with a guarantee face value. The method can include receiving mailing data that can include at least one rate factor and a value of postage disbursed for each of a plurality of mailpieces franked under terms of the guarantee. The method can further include accumulating the value of postage disbursed for each of the plurality of mailpieces franked under the terms of the guarantee and comparing the accumulated value of postage disbursed with the face value of the guarantee. In response to determining that the accumulated value of postage disbursed is less than the face value of the guarantee, postage funds from an account corresponding to a lessee of the PSD can be downloaded to the PSD, thereby increasing the value of its descending register.

Another embodiment of the invention includes a system for managing a value of a descending register of a postal security device (PSD) in accordance with a guarantee face value. The system can include a database that can store mailing data, terms of the guarantee, and PSD status data. A control module can be in signal communication with the database, and can receive mailing data therefrom. The control module can compare the face value of the guarantee to an accumulated value of postage disbursed from a mailing machine that processes a plurality of mailpieces under the guarantee. A replenishment module can be responsive to the control module to download funds to the PSD from an account corresponding to a lessee of the PSD if the accumulated value is less than the face value.

A further embodiment of the invention includes a method for managing a value of a descending register of a postal security device (PSD) in accordance with a guarantee. The method can include receiving mailing data that includes a guarantee rate, and a public rate of postage disbursed for a mailpiece franked under terms of the guarantee. The method can compare the public rate to the guarantee rate, and in response to determining that the public rate is equal to or less than the guarantee rate, postage funds can be downloaded from an account corresponding to a lessee of the PSD.

DETAILED DESCRIPTION OF THE INVENTION

In accordance with embodiments of the present invention, a system can process mailpieces under a special, guaranteed rate while controlling a mailing machine to disburse upon the mailpieces postage under a current, public rate schedule that may differ from the guaranteed rate. Mailpieces processed under the guaranteed rate in accordance with embodiments of the present invention can be made to appear to the carrier to be indistinguishable from mailpieces processed in accordance with the different public rate. In this way, mailpieces generated in accordance with the guaranteed rate may be processed without having to change carrier infrastructure. The guaranteed rate structure may be specific to an individual user and may differ between users. For example, a high volume user may receive a lower guaranteed rate structure than a lower volume user. Other guaranteed rate structures may be provided based upon a user meeting other carrier constraints, as mailing large volumes on a specific day of the week versus another day.

Figure 2:
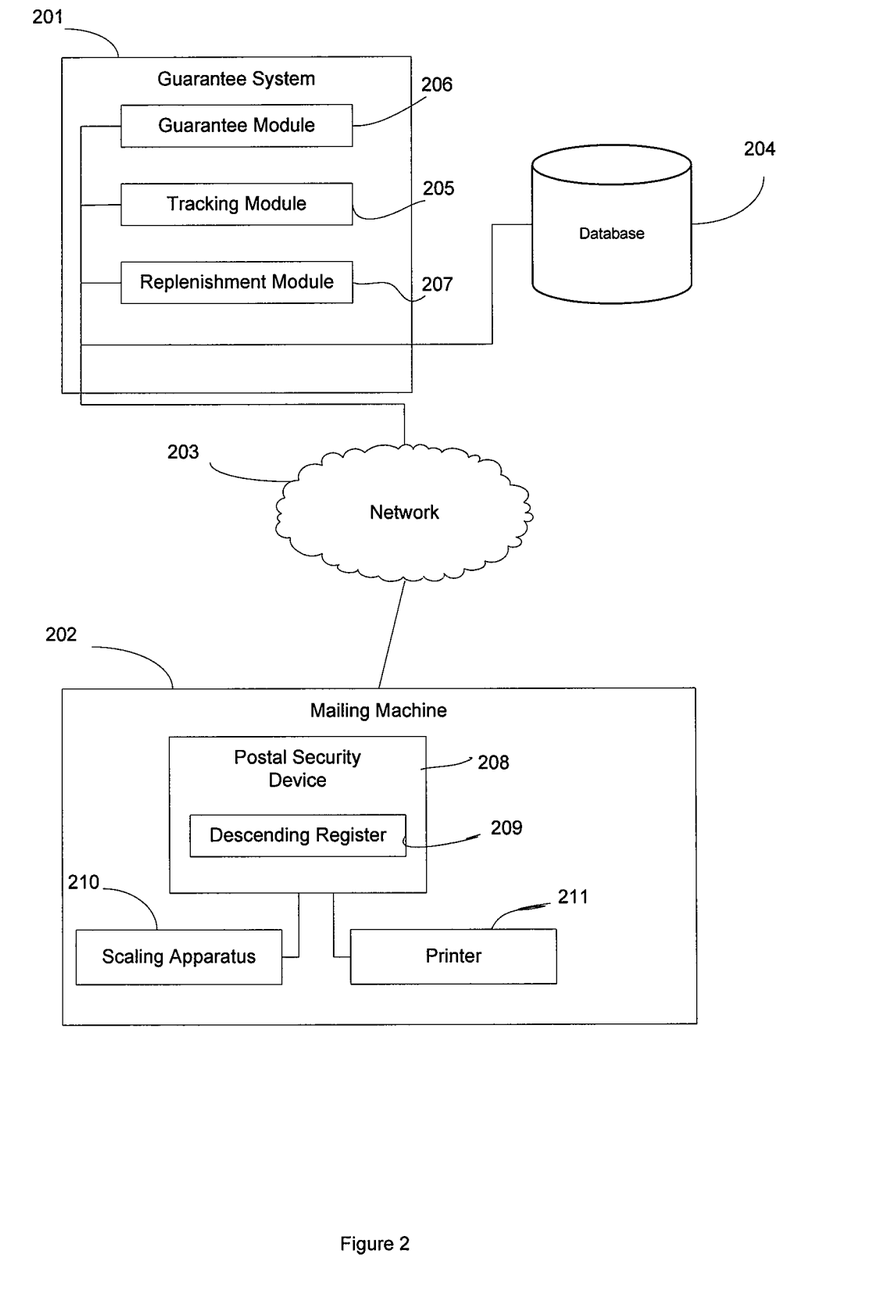
FIG. 2 shows a system in accordance with an embodiment of the present invention.

A system in accordance with an embodiment of the present invention is shown in FIG. 2. A guarantee system 201 can be coupled to mailing machine 202 that includes a PSD 208 having an ascending register (not shown) and a descending register 209, through network 203. Network 203 can be the Internet, a Local Area Network (LAN), a Wide Area Network (WAN), a wireless network, a telephone network, etc. Guarantee system 201 can include a processor coupled to memory storing instructions adapted to be executed by the processor to perform at least a part of the method in accordance with an embodiment of the present invention. The processor can be a general purpose microprocessor, an Application Specific Integrated Circuit that embodies at least part of the method in accordance with the present invention in its hardware or firmware, etc. Memory can be RAM, ROM, flash memory, a hard disk or any other suitable device capable of storing information electronically.

Mailing machine 202 can include a scaling apparatus 210 that can weigh and/or measure the spatial dimensions of a mailpiece, a printer 211 for disposing indicia (also herein referred to as "franks") on mailpieces, a Postal Security Device (PSD) 208 and other components, such as a document feeder, an envelope feeder, and inserter, etc. (not shown). Mailing machine 202 can be coupled to guarantee system 201 directly or indirectly.

Guarantee system 201 can be coupled to database 204 that can store records that can correlate one or more identifiers (e.g., a guarantee identifier, a customer identifier, a mailing machine identifier, a PSD identifier, etc.) with a set of rate factors, rates and/or guarantee rate data. Rates can include the cost of mailing expressed in any suitable currency, credits (prepaid or postpaid), etc. Guarantee terms can include a number of mailpieces for which the correlated rate factors and rates are guaranteed, a time duration for which such a guarantee is to last, one or more locations or areas for which the guarantee is valid, times of day during which the guarantee is effective, etc. Database 204 can also store public rate data, such as the rate factors and current cost of delivering a mailpiece of a given weight with a given class of service.

Guarantee system 201 can include a control module 205 in communication with database 204. Control module 205 can monitor the processing of mailpieces under a guarantee, such as by comparing mailpiece processing data with the terms of the guarantee and current public rate data. For example, the control module 205 can receive mailpiece processing data from mailing machine 202 through network 203. The mailpiece processing data can include the amount of funds disbursed by a PSD 208 to process a mailpiece, rate factors for the processed mailpiece (e.g., size, weight, class, mailing location, destination address data, services purchased, etc.) and other processing data, such as the time and date on which the mailpiece was processed, etc. Control module 205 can also track an origin of account(s) from which to transfer postage to the PSD 208 and the value of ascending and/or descending registers 209 in a PSD 208 that can be used to process mailpieces, such as to ensure that the PSD 208 has sufficient funds to disburse postage under the terms of a guarantee. This PSD 208 status data and mailpiece processing data can be stored by control module 205 in database 204.

In accordance with embodiments of the present invention, control module 205 can track, accumulate and store within database 204 a total amount of postage funds disbursed under the terms of a guarantee, as well as associated mailpiece processing data. In an embodiment, mailing machine 202 can process certain mailpieces under the terms of a first guarantee and the same mailing machine 202 can process other mailpieces under the terms of a distinct, second guarantee or in accordance with public rates. The guarantee rate or public rate under which a mailpiece is processed can be identified by control module 205. For example, a guarantee rate or public rate identifier can be associated with the mailing data for a mailpiece that is received by tracking module 205. In this way, downloaded postage can be properly allocated to the correct identified accounts based upon the identified guarantee under which one or more mailpieces are processed by the mailing machine 201.

Guarantee system 201 can also include a guarantee module 206 and a replenishment module 207, each responsive to the control module 205 for downloading funds to the PSD 208 for postage disbursement. Funds transferred to PSD 208 can be downloaded using standard funds transfer protocols. Replenishment module 207 is in communication with any of a financial institution, a third-party funds provider, etc., and is responsive to control module 205 to download postage from an account of the meter lessee to the PSD 208. Guarantee module 206 can also be in communication with any of a financial institution, a third-party funds provider, etc., and responsive to control module 205 to download postage from an account of the guarantor to the PSD 208 in accordance with the terms of a guarantee, as described in detail below.

Figure 3:
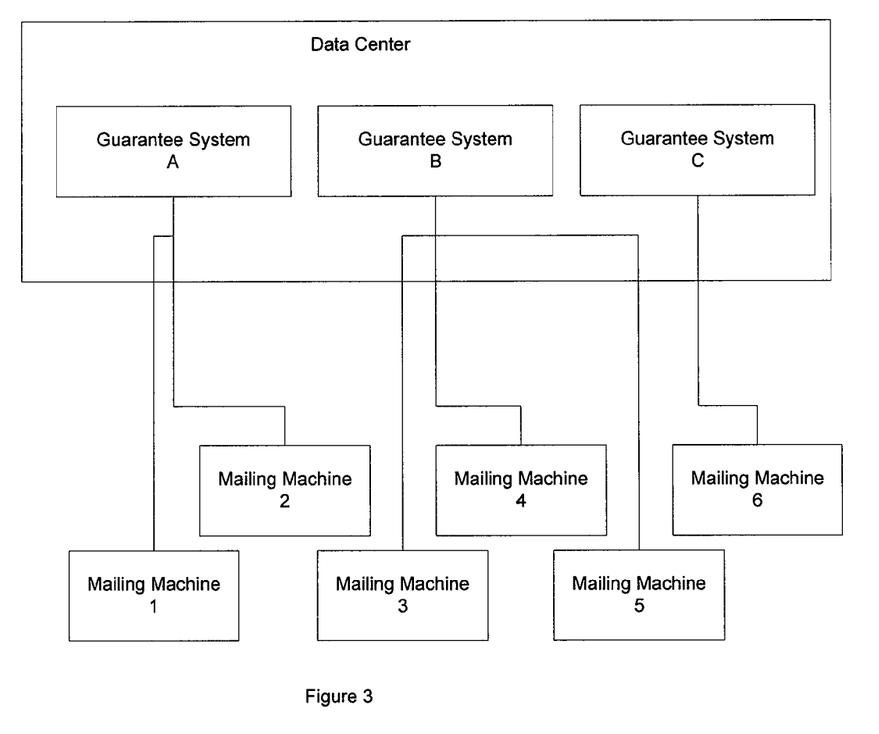
FIG. 3 shows a system, including a guarantee system and mailing machine, in accordance with an embodiment of the present invention.
Figure 4:
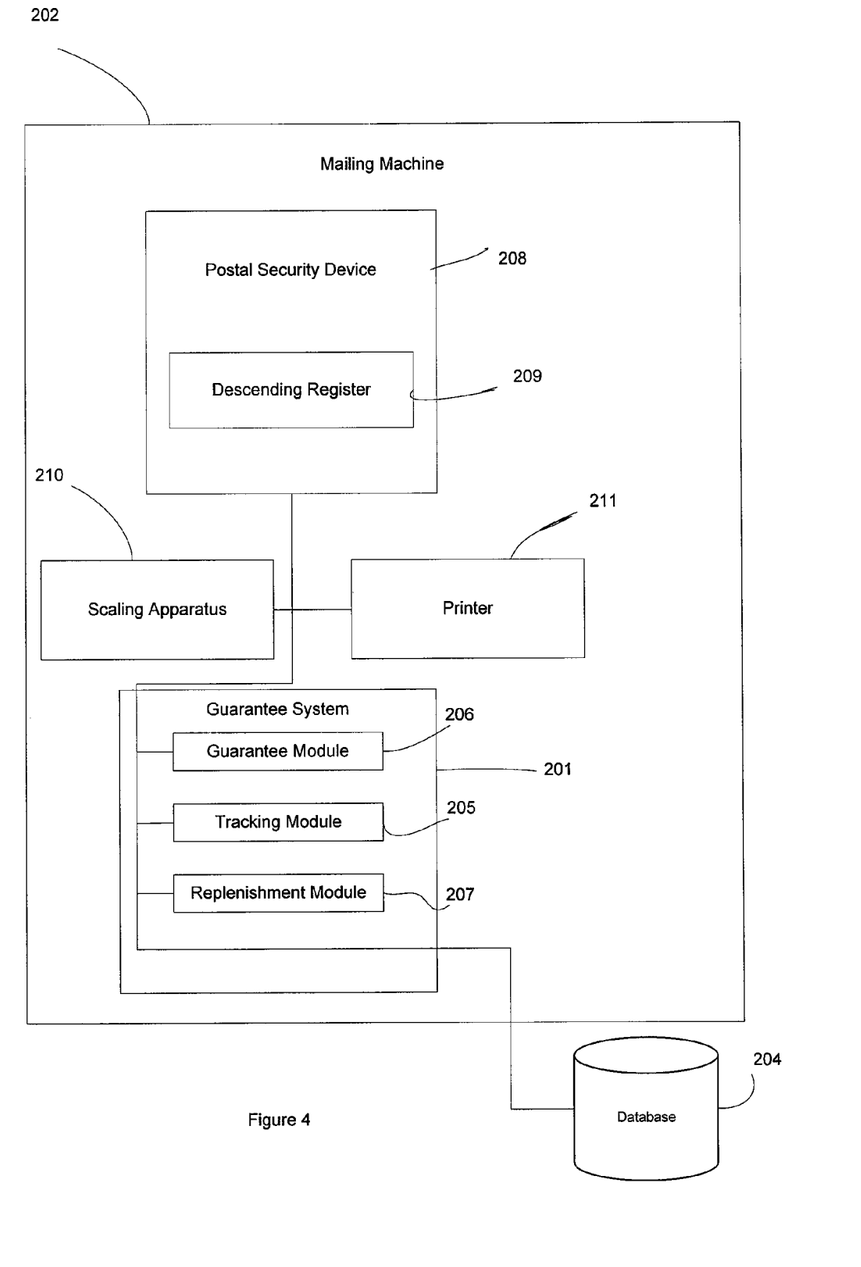
FIG. 4 shows a guarantee system as a component of a mailing machine in accordance with an embodiment of the present invention.

In accordance with an embodiment of the present invention and as shown in FIG. 3, one or more guarantee systems can exist at a data center of a third party service provider and support one or more mailing machines at one or more sites of a specific customer. As shown in FIG. 3, guarantee system A is in communication with mailing machines 1 and 2, which may be at the same customer site, at different sites for the same customer, at the same site for different customers, or at different sites for different customers. Similarly, guarantee system B is in communication with mailing machines 3, 4 and 5, while guarantee system C is in communication with mailing machine 6. In accordance with another embodiment shown in FIG. 4, guarantee system 201 can be included in mailing machine 202.

The PSD 208 described herein need not be physically incorporated within mailing machine 202, but may also be a virtual device, such as a virtual PSD located at a data center of the service provider and capable of serving an entire customer organization via on-line network 203. In some embodiments, both guarantee system 201 and the PSD 208 may be located at the service provider data center. Such an arrangement allows all of a specific customer's sites to access the same remote PSD 208, or set of PSDs, and be confident that they are receiving the guaranteed rate structure negotiated with the guarantor.

A method in accordance with embodiments of the present invention can include tracking the activity of one or more mailing machines 202, operating in accordance with a guarantee and modifying the state of a descending register of one or more PSDs 208 to ensure mailpieces are processed in accordance with the guarantee.

For example, a guarantee specifies that 1000 letters are to be delivered via first-class service at a rate of 42 cents apiece, thereby having a face value of $42.00. In some embodiments, the guarantee may be provided for a specified period of time, or term and may vary as to the disbursement value per mailpiece.

Assuming that the public rate is equal to the guarantee rate, a total amount of postage needed to fund the guarantee is equal to the face value. All or part of this total amount of postage can be downloaded to a PSD 208 from the replenishment module 207 when the guarantee takes effect. If part of the total amount is downloaded, the replenishment module 207 can use data collected by the control module 205 to determine if and when the value of the descending register 209 falls below a threshold specified in a funding rule. For example, if $10.00 is initially downloaded to the PSD 208, the PSD threshold may be $2.00. When the control module 205 detects that the value of the descending register 209 of the PSD 208 falls below $2.00, it can cause additional funds, e.g., $8.00, to be downloaded by the replenishment module 207 to the PSD 208, thereby increasing the value of the descending register 209. This can be repeated until terms of the guarantee are met, such as the total amount downloaded being equal to the face value of the guarantee, for example. As explicitly assumed above, if the public rate is the same as the guarantee rate for the duration of the guarantee (here, 1000 mailpieces), then the total amount disbursed would be $42.00, which is equal to the face value of the guarantee.

If the public rate is higher than the guarantee rate for any of the processed mailpieces, then the total amount downloaded would be more than the face value of $42.00. For example, if the public rate is 42 cents for the first 500 mailpieces and then increases to 44 cents for the remaining 500 mailpieces, the total amount downloaded to process the mailpieces for delivery would be ($0.42×500+$0.44× 500)=$21.00+$22.00=$43.00. Because of the guarantee, the customer would only pay, via replenishment module 207, the face value of the guarantee, or $42.00 of the total amount downloaded, and the guarantor would pay, via guarantee module 206, the extra $1.00 in accordance with an embodiment of the present invention. In some embodiments, each postage download is allocated according to terms of the guarantee. For example, if the guarantee rate is less than the public rate, the amount of postage downloaded that corresponds to the guarantee rate is downloaded from a customer (meter lessee) account, and the amount of postage downloaded that corresponds to the difference between the public rate and the guarantee rate is downloaded from the guarantor account.

While an embodiment has been described with a single rate for 1,000 mailpieces, a guarantee can have any suitable structure. For example, a guarantee can specify that 1,200 mailpieces can be delivered first-class anywhere in the United States for $0.40; second-class for $0.28, etc. Further, more than one guarantee, each with its own rate structure, can be implemented in connection with one or more mailing machines. For example, a first mailing machine can implement a guarantee for up to 1,500 mailpieces that can be mailed first-class for $0.43, provided they are processed no later than a given date in the future, e.g., by Jan. 14, 2010. A second mailing machine can implement a different guarantee for up to 2,000 mailpieces, mailed third-class, no later than a certain date, provided they are processed during weekend hours or during the week, between the hours of midnight and 6:00 A.M. The control module 205 is adapted to interpret the mailing data to identify a guarantee under which a mailpiece was franked. Control module 205 further identifies the appropriate customer and guarantor accounts corresponding to the identified guarantee, and debits at the appropriate account at least part of the amount corresponding to the total amount of postage funds downloaded.

In accordance with an embodiment of the present invention, the total amount downloaded, up to the face value of the guarantee, can be caused to be debited from a customer account by the replenishment module 207. If additional amounts are needed because the public rate is higher than the guarantee rate during the term of the guarantee, then the guarantee module 206 can cause a guarantor account to be debited for the additional amounts greater than the face value.

Guarantee system 201 can store and implement one or more funding rules that prescribe thresholds under which a PSD 208 is to be credited, and to what extent. For example, such a funding rule can prescribe that if a PSD 208 descending register 209 is determined by control module 205 (via reading and comparing the value of the descending register 209 to a given value) to fall beneath the given value of the descending register 209, and that the amount remaining to be disbursed under a guarantee exceeds a given guarantee face value, then the descending register 209 of the PSD 208 is to be credited (increased by) the amount in excess of the face value by guarantee module 206. Other thresholds that may be described by exemplary funding rules that can include transfer of funds to PSD 208 at a particular frequency, such as daily, weekly, monthly, following processing of a set number of mailpieces, or based upon an extrapolation of historical demands placed on a given PSD 208. For example, if a PSD 208 shows a surge in demand for postage disbursement on Tuesdays, then the surge can be anticipated by a funding rule that is formulated to cause additional funds to be downloaded to the PSD 208 on Monday evenings. Such past activities and patterns can be tracked by control module 205 and stored in database 204.

Figure 5:
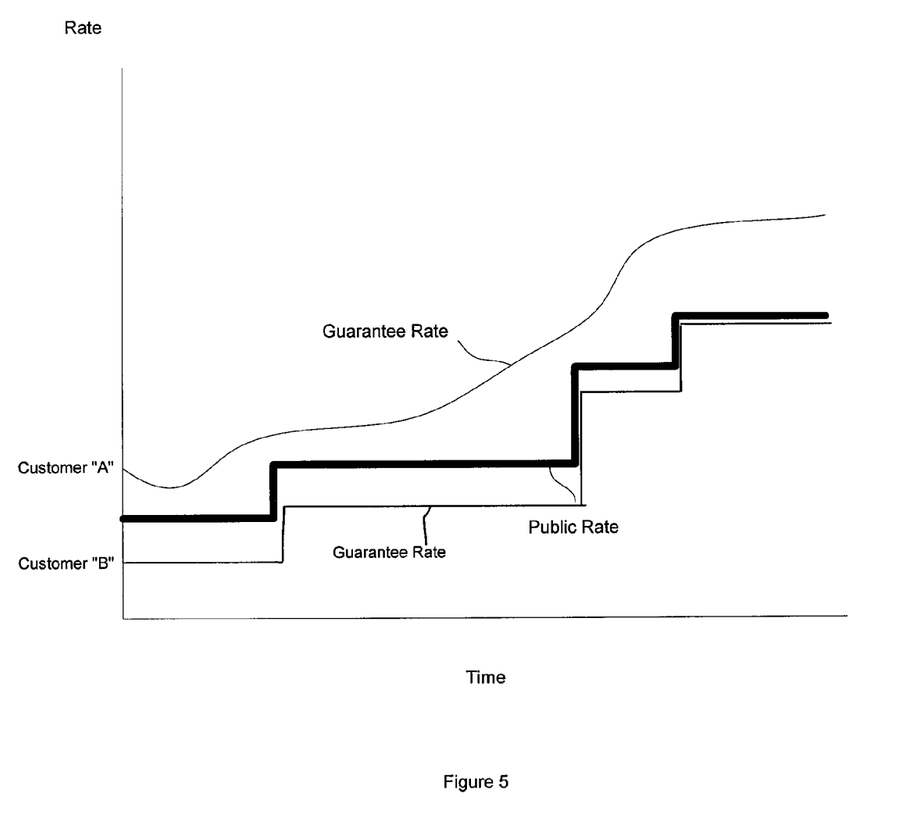
FIG. 5 shows a relationship between guarantee rate and public rate in accordance with an embodiment of the present invention.

One of the purposes of the guarantee is to remove or reduce financial risk due to carrier rate changes, surcharges, other changes in costs, etc. Any suitable pricing for a guarantee can be accommodated by embodiments in accordance with the present invention. In an embodiment, the cost of the guarantee is contemplated to be higher than the face value of a guarantee. The face value of the guarantee can be determined in any suitable way. In various embodiments, the guarantee can be limited by a rate schedule and a maximum number of mailpieces for each set of rate factors in the rate schedule, a monetary cap, etc. The cost of the guarantee above the face value can represent a premium for the guarantor for assuming the risk that the actual cost of the guarantee will exceed the face value, plus a fee. The amount charged by the guarantor can be affected by the likelihood of a public rate increase during the term of the guarantee, as well as the timing of such an increase. For example, a more imminent increase could raise the cost of the guarantee above the face value more than an increase of the same size that is more likely to occur towards the end of a term of the guarantee. This is shown in FIG. 5, which shows a "Customer A" pricing strategy in the context of rate changes. The vertical axis corresponds to monetary cost, while the horizontal axis corresponds to time. The step function represents the public rate, which shows rate increases, while the line above it represents a rate of the guarantee cost (i.e., a per-mailpiece guarantee cost). As the time at which the guarantee becomes effective approaches the time of a rate increase, the rate of the guarantee cost is contemplated to be greater.

In another embodiment, as shown in FIG. 5, the cost of the guarantee to "Customer B" can be less than the face value of the guarantee in view of the public rate at the time the guarantee it is made or becomes effective. This arrangement can be made when the public rate is expected to fall, e.g., volume discount, a fuel surcharge presently in effect is expected to be reduced or disappear; when a discount from the public rate is expected from the carrier, when a third party will subsidize the cost of delivery, etc.

Figure 6:
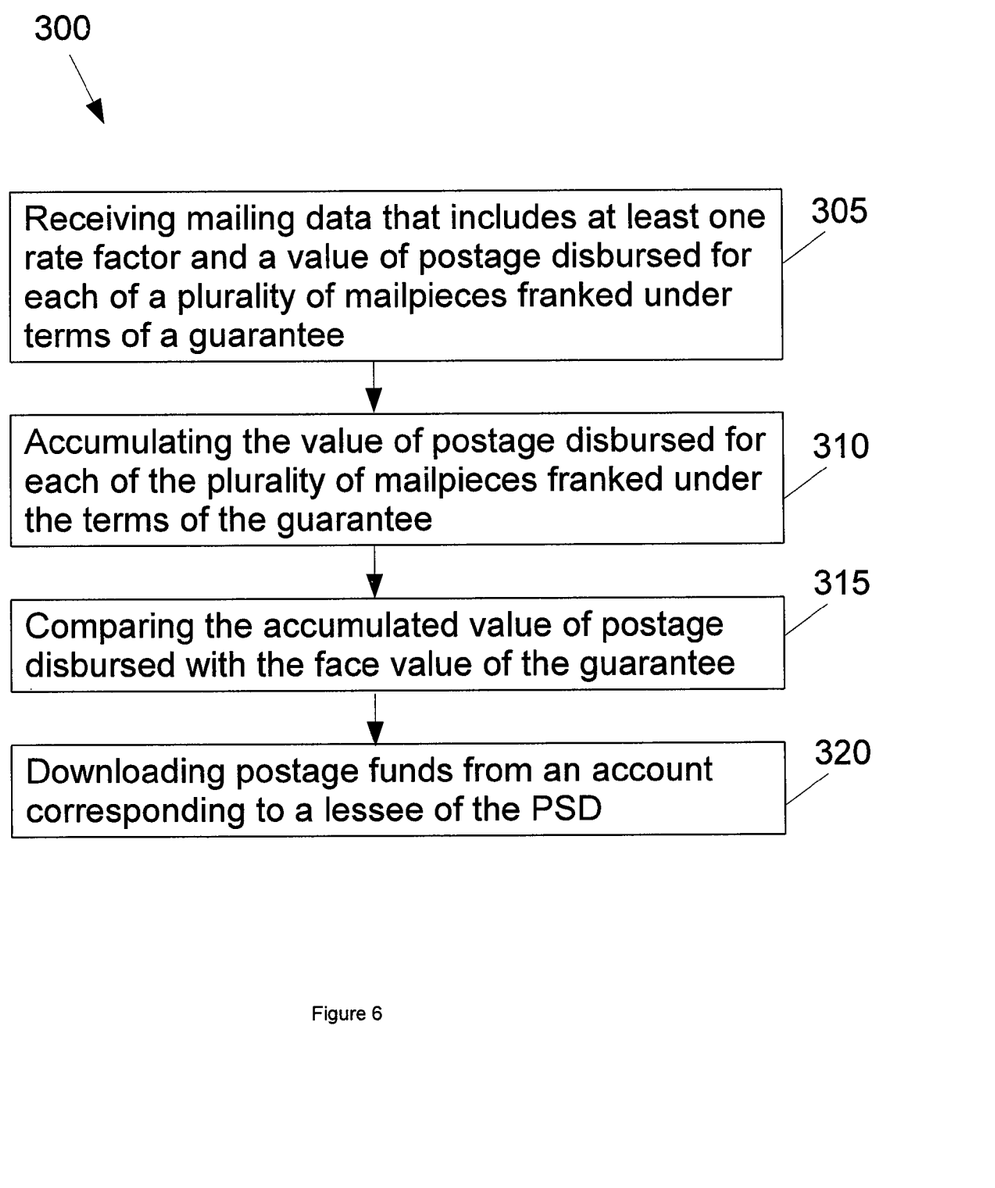
FIG. 6 shows a flowchart of process steps in accordance with an embodiment of the present invention.

In view of the foregoing, FIG. 6 depicts a flowchart 300 of process steps for managing a value of a descending register of a postal security device (PSD) in accordance with a guarantee having a face value. The method begins at process step 305 with receiving mailing data that includes at least one rate factor and a value of postage disbursed for each of a plurality of mailpieces franked under terms of a guarantee. At process step 310, the value of postage disbursed for each of the plurality of mailpieces franked under the terms of the guarantee is accumulated. Process step 315 includes comparing the accumulated value of postage disbursed with the face value of the guarantee. In response to determining that the accumulated value of postage disbursed is less than the face value of the guarantee, process step 320 includes downloading postage funds from an account corresponding to a lessee of the PSD.

An embodiment of the invention may be embodied in the form of computer-implemented processes and apparatuses for practicing those processes. Embodiments of the present invention may also be embodied in the form of a computer program product having computer program code containing instructions embodied in tangible media, such as floppy diskettes, CD-ROMs, hard drives, USB (universal serial bus) drives, flash memory, smart cards or any other computer readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments can configure the microprocessor to create specific logic circuits. A technical effect of the executable instructions is to manage a value of a descending register within a postal security device in accordance with a postage rate guarantee.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method for managing a value of a descending register of a postal security device (PSD) in accordance with a guarantee having a face value, the method comprising:
    receiving, by a processor, mailing data that includes at least one rate factor and a value of postage disbursed for each of a plurality of mailpieces franked under terms of the guarantee by the PSD, the guarantee specifying a maximum postage rate, less than a corresponding public rate, that a postal customer is required to pay for the plurality of mailpieces;
    accumulating, by the processor, the value of postage disbursed for each of the plurality of mailpieces franked by the PSD under the terms of the guarantee;
    comparing, by the processor, the accumulated value of postage disbursed with the face value of the guarantee;
    in response to the comparison, downloading, by the processor from a first account maintained by a first system and corresponding to a lessee of the PSD, a first value; and
    downloading, by the processor from a second account maintained by a second system and corresponding to a provider of the guarantee, a second value in an amount equal to a difference between the accumulated value of postage disbursed and the face value,
        wherein the second account, the second system, and the provider of the guarantee are separate from the first account, the first system, and the lessee of the PSD.

2. The method of claim 1, further comprising:
    determining that the accumulated value of postage disbursed is greater than or equal to the face value of the guarantee.

3. The method of claim 1, further comprising:
    reading the value of the descending register of the PSD;
    comparing the value of the descending register to a threshold; and in response to determining that the value of the descending register is less than the threshold, downloading postage funds to the PSD, thereby increasing the value of the descending register.

4. The method of claim 3, wherein the downloading postage funds comprises increasing the value of the descending register to an amount greater than the threshold.

5. The method of claim 1, wherein the at least one rate factor includes at least one from the group of: a class of service; a weight; and a physical dimension.

6. The method of claim 1, further including identifying the guarantee under which each of the plurality of mailpieces was franked.

7. The method of claim 6, further including identifying the second account and debiting the second account at least part of the second value.

8. The method of claim 1, further comprising debiting the first account an amount corresponding to a guarantee rate of the guarantee.

9. The method of claim 1, further comprising debiting the second account an amount corresponding to the difference between the public rate and a guarantee rate of the guarantee.

10. The method of claim 1, wherein the guarantee indicates a number of mailpieces for which the maximum postage rate is guaranteed.

11. A system for managing a value of a descending register of a postal security device (PSD) in accordance with a guarantee having a face value, the system comprising:
a database implemented on a storage device that stores mailing data, terms of the guarantee, and PSD status data;
a device comprising a processor, the device in signal communication with the database;
a non-transitory, computer-readable storage medium in communication with the processor and storing instructions that, when executed by the processor, cause the processor to perform operations comprising:
receiving mailing data that includes at least one rate factor and a value of postage disbursed for each of a plurality of mailpieces franked under terms of the guarantee by the PSD, the guarantee specifying a maximum postage rate, less than a corresponding public rate, that a postal customer is required to pay for the plurality of mailpieces;
accumulating the value of postage disbursed for each of the plurality of mailpieces franked by the PSD under the terms of the guarantee;
comparing the accumulated value of postage disbursed with the face value of the guarantee;
in response to the comparison, downloading from a first account maintained by a first system and corresponding to a lessee of the PSD, a first value; and
downloading from a second account maintained by a second system and corresponding to a provider of the guarantee, a second value in an amount equal to a difference between the accumulated value of postage disbursed and the face value,
wherein the second account, the second system, and the provider of the guarantee are separate from the first account, the first system, and the lessee of the PSD.

12. The system of claim 11, wherein the operations further comprise:
determining that the accumulated value of postage disbursed is greater than or equal to the face value of the guarantee.

13. The system of claim 11, wherein mailing data includes at least one from the group of: a value of funds disbursed by the PSD to process each of the plurality of mailpieces; rate factors for each processed mailpiece; a date on which each mailpiece was processed; and the time of day at which each mailpiece was processed.

14. The system of claim 12, wherein the operations further comprise:
identifying the guarantee under which each of the plurality of mailpieces was franked.

15. The system of claim 14, wherein the operations further comprise:
identifying the second account and debiting the second account at least part of the second value.

16. The system of claim 11, wherein the value of postage disbursed upon each of the plurality of mailpieces is equal to the public rate; and the operations further comprise:
debiting the first account an amount corresponding to a guarantee rate of the guarantee.

17. The system of claim 16, wherein the operations further comprise:
comparing the guarantee rate to the public rate; and
debiting the second account an amount corresponding to the difference between the public rate and the guarantee rate if the public rate is greater than the guarantee rate.

18. The system of claim 11, said database further configured to store: an origin of one or more accounts from which to transfer postage to the PSD; a value of an ascending register of the PSD; a value of a descending register of the PSD; and an indication of whether the PSD contains sufficient funds to disburse postage under the terms of the guarantee.

19. A system comprising:
a database implemented on a storage device, the database storing a guarantee having a face value and specifying a maximum postage rate, less than a corresponding public rate, that a postal customer is required to pay for a plurality of mail pieces;
a postal security device (PSD) storing components comprising a descending register;
a processor in communication with the database and the PSD; and
a non-transitory, computer-readable medium in communication with the processor and storing instructions that, when executed by the processor, cause the processor to perform operations comprising:
receiving, by the processor from the PSD, mailing data that includes a rate factor and a value of postage disbursed for each of a plurality of mail pieces franked by the PSD;
accumulating, by the processor, the value of postage disbursed for each of the plurality of mail pieces franked by the PSD;
comparing the accumulated value of postage disbursed with the face value of the guarantee; and
in response to the comparison, downloading, by the processor from a first account maintained by a first system and corresponding to a lessee of the PSD, a first value; and
downloading, by the processor from a second account maintained by a second system and corresponding to a provider of the guarantee, a second value in an amount equal to a difference between the accumulated value of postage disbursed and the face value, wherein the second account, the second system, and the provider of the guarantee are separate from the first account, the first system, and the lessee of the PSD.

* * * * *